(12) United States Patent
Mace

(10) Patent No.: US 6,458,188 B1
(45) Date of Patent: Oct. 1, 2002

(54) METHOD AND MEANS FOR AIR FILTRATION

(76) Inventor: Timothy D. Mace, 3924 E. 8th St., Des Moines, IA (US) 50316

( * ) Notice: Subject to any disclaimer, the term of this patent is extended or adjusted under 35 U.S.C. 154(b) by 0 days.

(21) Appl. No.: 09/615,997

(22) Filed: Jul. 14, 2000

(51) Int. Cl.⁷ ................................................ B01D 47/06
(52) U.S. Cl. ........................... 95/199; 95/224; 95/225; 95/229; 96/270; 96/271; 96/322
(58) Field of Search .......................... 95/199, 223, 224, 95/225, 228, 229; 96/322, 270, 271, 273

(56) References Cited

U.S. PATENT DOCUMENTS

| | | | | |
|---|---|---|---|---|
| 903,150 | A | * | 11/1908 | Braemer |
| 1,117,309 | A | * | 11/1914 | Bentz |
| 1,222,541 | A | * | 4/1917 | Donham |
| 1,736,408 | A | * | 11/1929 | Lauer |
| 1,985,910 | A | * | 1/1935 | Anderson |
| 2,092,305 | A | * | 9/1937 | Estes et al. |
| 2,110,203 | A | * | 3/1938 | Crawford |
| 2,186,125 | A | * | 1/1940 | Roberts |
| 2,998,059 | A | * | 8/1961 | Johnson |
| 3,372,530 | A | * | 3/1968 | Zimmer |
| 3,668,833 | A | * | 6/1972 | Cahill, Jr. |
| 3,795,089 | A | * | 3/1974 | Reither |
| 3,925,040 | A | * | 12/1975 | Fattinger |
| 3,963,416 | A | | 6/1976 | Mach |
| 4,053,292 | A | * | 10/1977 | Schneider et al. |
| 4,140,501 | A | * | 2/1979 | Ekman |
| 4,257,225 | A | | 3/1981 | Crone, Jr. |
| 4,286,528 | A | | 9/1981 | Willard |
| 4,544,380 | A | * | 10/1985 | Itou et al. |
| 4,604,108 | A | * | 8/1986 | Cotton, Jr. |
| 5,251,564 | A | | 10/1993 | Rim et al. |
| 5,272,874 | A | | 12/1993 | Paas |
| 5,348,562 | A | | 9/1994 | Burrous et al. |
| 5,456,069 | A | | 10/1995 | Haerle |
| 5,505,752 | A | | 4/1996 | Burrous et al. |
| 5,606,854 | A | | 3/1997 | Hoffmann |
| 5,713,290 | A | | 2/1998 | Huang |

* cited by examiner

Primary Examiner—Duane S. Smith
(74) Attorney, Agent, or Firm—McKee, Voorhees & Sease, P.L.C.

(57) ABSTRACT

A method of filtering an air or gas stream utilizes a liquid, such as water, to saturate the gas stream. A sufficient quantity of water is presented to the gas stream to saturate the gas stream and knock particulate matter out of the gas stream. The gas stream can be cooled prior to saturating it with liquid. It may be desirable to reduce the flow rate of the gas stream to ensure maximum filtration. After the particulate matter is knocked out of the gas stream, it can be removed and processed as desired.

19 Claims, 4 Drawing Sheets

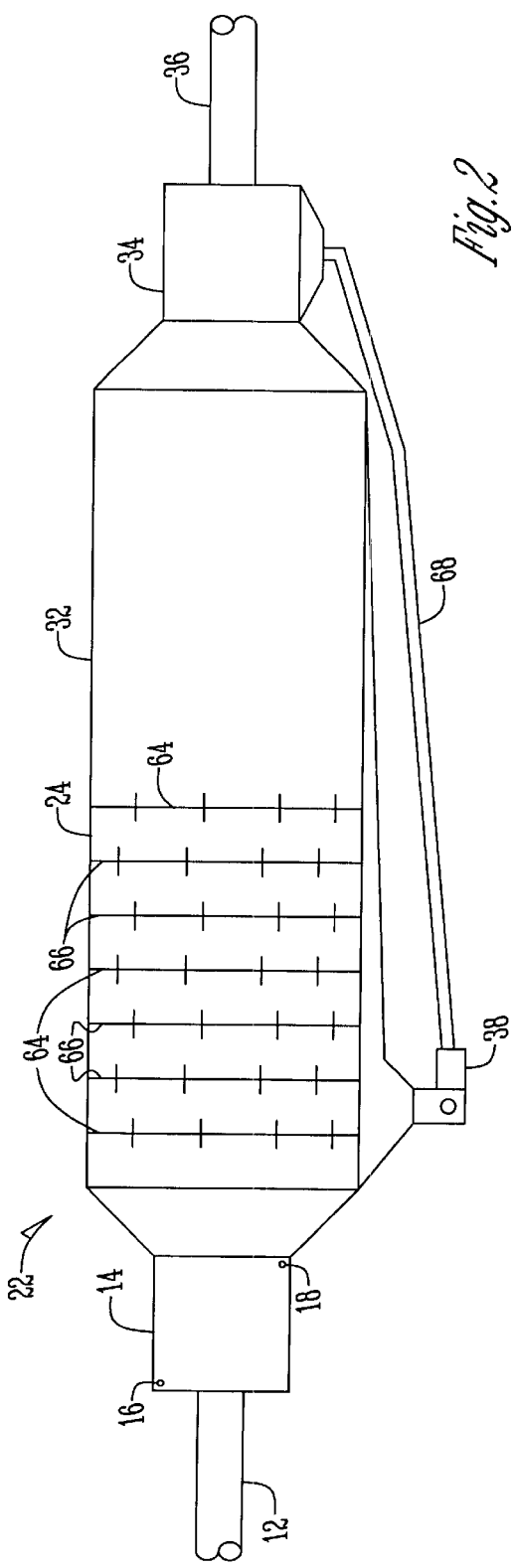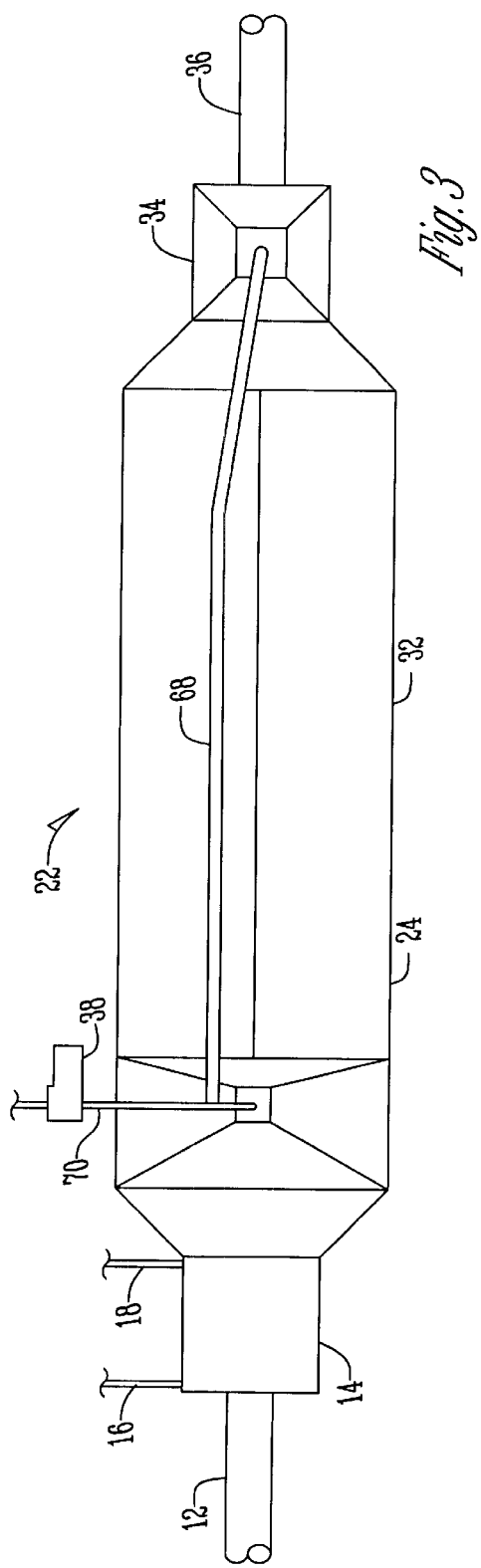

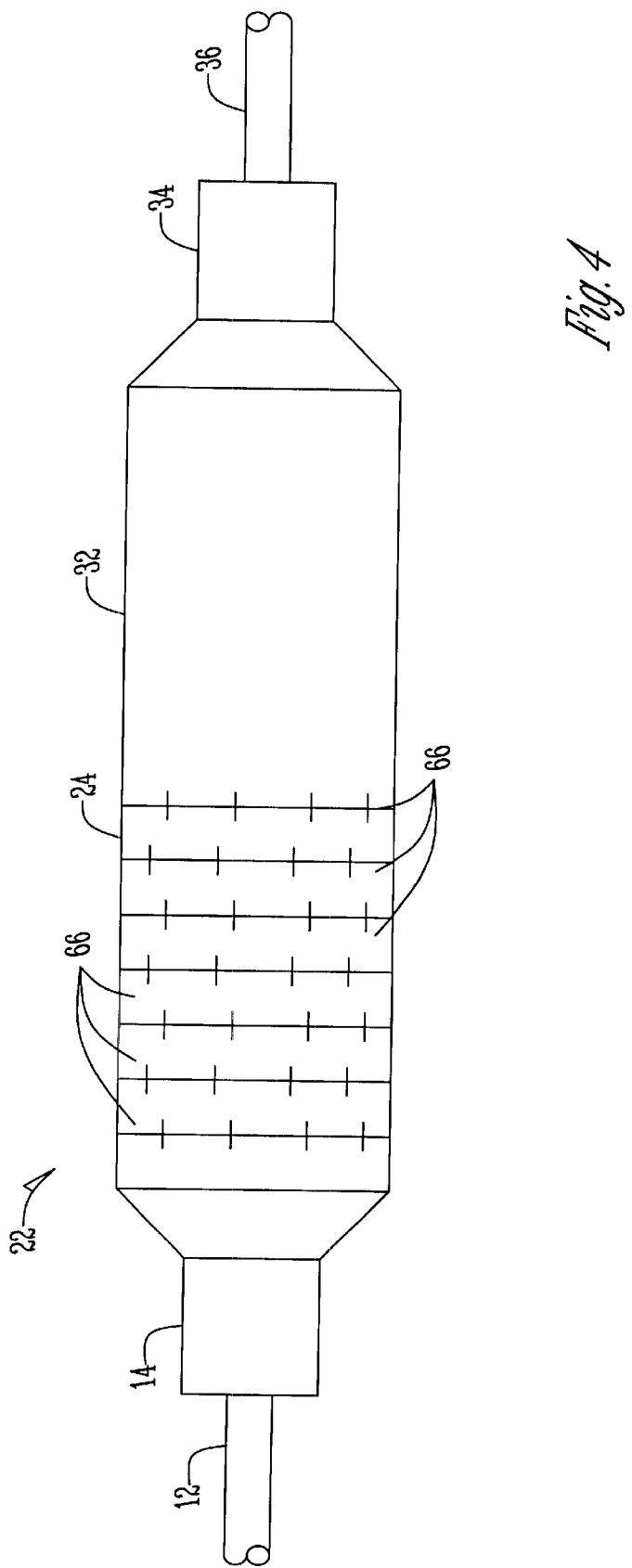

METHOD AND MEANS FOR AIR FILTRATION

BACKGROUND OF THE INVENTION

A. Field of the Invention

The present invention relates to air filtration. More particularly, but not exclusively, the present invention relates to a method and means for filtering exhaust gas from a fixed-base combustion source, such as a boiler.

B. Problems in the Art

Air pollution is caused by the discharge into the air of gases and materials such as carbon dioxide, hydrocarbons, sulfur dioxide, nitrogen dioxide, carbon monoxide, soot, dust, and chemicals associated with the combustion process. Automobiles contribute approximately 40% of the pollutants released into the air per day. Due to their size, mobile nature, and fuel, not much can be done to clean up automobiles, except hope for a cleaner fuel. However, the remaining 60% of air pollutants, which are mainly attributable to boilers, furnaces, incinerators, and manufacturing processes, can be reduced. These pollutant sources are all fixed-base, i.e., stationary. By removing or filtering the pollutants from these stationary sources, much can be done to reduce air pollution.

Currently, there are no known filtration methods or systems which adequately clean exhaust gases from sources such as boilers. Bag filters fill up quickly and need to be changed and cleaned often. Fiber filters and ceramic filters also fill up quickly and need to be changed often. Ion filters last longer than bag filters or ceramic filters, but cost more to clean and maintain. There is a need in the art for a method and system which can filter the pollutants out of the large quantities of exhaust gas that are produced by fixed-base sources.

Therefore, it is a primary object of the present invention to reduce air pollution.

It is a further object of the present invention to remove particulate and toxic matter from the exhaust stream produced by boilers, furnaces, incinerators, and the like.

It is a further object of the present invention to provide an air filtration system and method which is economical, durable in use, and efficient in operation.

These, as well as other objects and features of the invention, will be apparent from the following detailed description and claims in conjunction with the accompanying drawings.

SUMMARY OF THE INVENTION

The present invention includes a method of filtering a gas stream. The method includes saturating the gas stream with a liquid to knock particulates out of the gas stream and into a receptacle. The method further includes removing the particulates from the receptacle. The method can be used to remove particulates from exhaust gases or from open air sources. In the preferred embodiment, water is the liquid used to knock particulates out of the gas stream. In addition to particulates, other materials which have been converted to gases during the combustion process, such as nitrates and sulfates, can be removed by the process of the present invention.

The present invention can also include an air filtration system. The filtration system has a filtration chamber. The filtration chamber has a gas stream inlet opening and a gas stream outlet opening. Both high and low pressure nozzles are in fluid communication with an interior portion of the filtration chamber. The nozzles are in fluid communication with a liquid supply. In a preferred embodiment, the liquid is water. The nozzles can deliver enough liquid or water to saturate the gas stream, knocking particulates out of the gas stream in the process.

BRIEF DESCRIPTION OF THE DRAWINGS

FIG. 2 is a right side elevational view of the filtration chamber.

FIG. 3 is a bottom plan view of the filtration chamber.

FIG. 4 is a top plan view of the filtration chamber.

DETAILED DESCRIPTION OF AN EXEMPLARY EMBODIMENT

The present invention will be described as it applies to an exemplary embodiment. It is not intended that the present invention be limited to the described embodiment. It is intended that the invention cover all modifications and alternatives which may be included within the spirit and scope of the invention.

Figure 1:
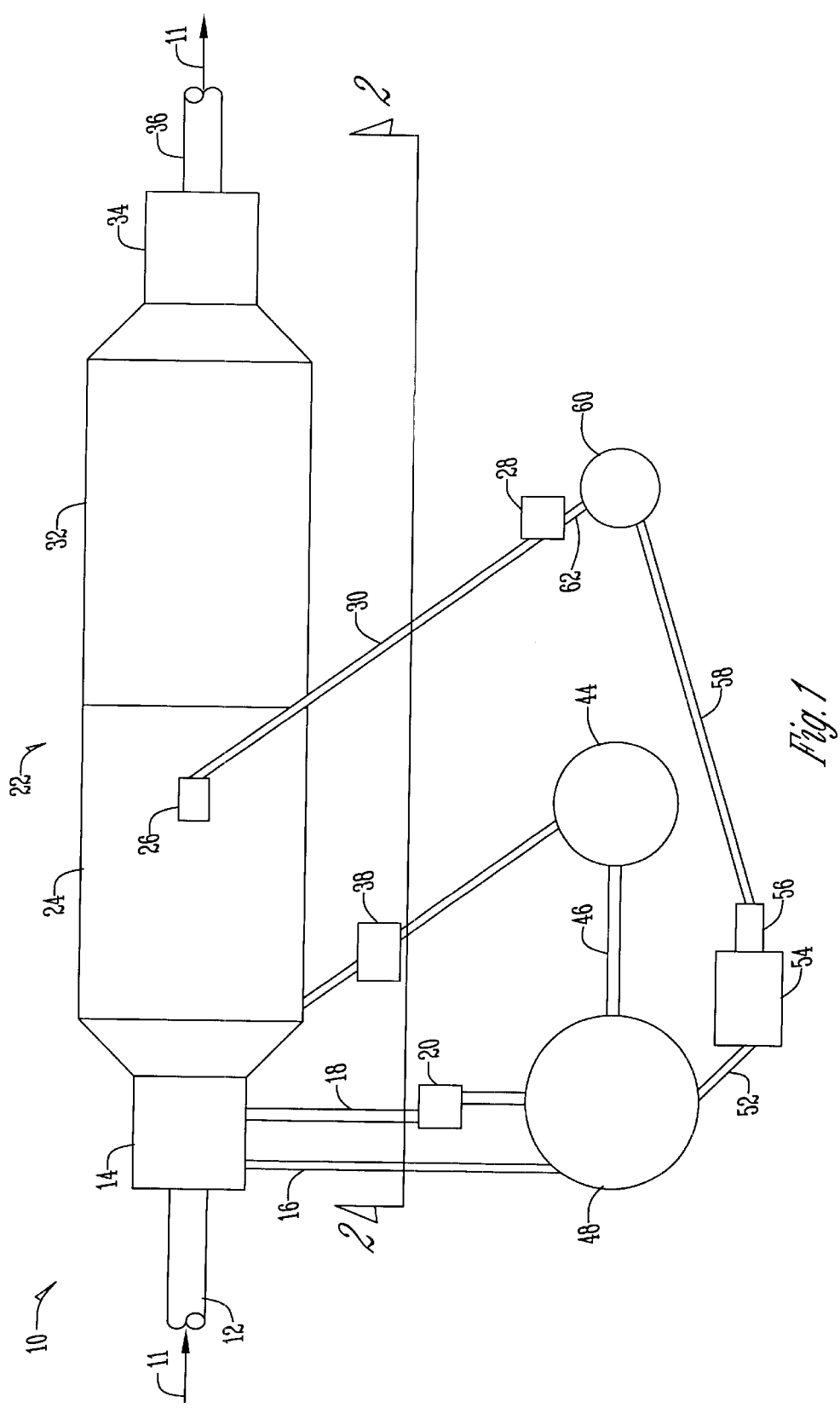
FIG. 1 is a top plan view of an embodiment of an air filtration system according to the present invention.

FIG. 1 shows a top plan view of an embodiment of an air filtration system 10 according to the present invention. Direction of gas or air flow through system 10 is indicated by arrow 11. A boiler exhaust flue 12 is connected to a heat exchanger 14. Heat exchanger 14 is designed to decrease the temperature of exhaust gas that enters into the heat exchanger 14 to a temperature of 70° Fahrenheit or less. The temperature of the exhaust gas should be reduced so that the temperature is less than the boiling point of the fluid that is applied to the exhaust stream (explained later on). The lower the temperature of the gas, the lower its saturation point is. As the saturation point is decreased, the exhaust gas will hold less particulates in suspension.

Heat exchanger 14 is a liquid heat exchanger which has a cold liquid input line 18 and a hot liquid exit line 16. In the preferred embodiment, water is used as the heat exchange fluid. Of course, other suitable liquids, such as anti-freeze, could be used as the heat exchange liquid medium. A heat exchanger chiller and pump 20 are connected to the cold air input line 18. Heat exchanger 14 is a conventional liquid flow heat exchanger. Rather than a heat exchanger, other suitable cooling mechanisms could be used.

In most situations, exhaust gas leaving the boiler exhaust flue 12 has a high velocity or flow rate. Heat exchanger 14 is preferably designed with a greater cross-sectional area than exhaust flue 12. The increased cross-sectional area will decrease the velocity or flow rate of the exhaust gas as it enters the heat exchanger 14. It is important to slow the exhaust gas down so that it has enough time to become fully saturated in the filtration chamber 22.

After the exhaust gas flows through and is cooled by heat exchanger 14, it enters into a filtration chamber 22. Filtration chamber 22 includes an exhaust gas saturation section 24 and a mist-vapor separation section 32. Filtration chamber 22 has a cross-sectional area greater than heat exchanger 14, decreasing the flow rate of the exhaust gas even further. Slowing the exhaust gas helps ensure maximum "cleansing" of the gas. Rather than being part of a single chamber 22, the gas saturation section 24 and the mist-vapor separation section 32 could be separate tanks. Alternatively, the mist-vapor separation section 32 could be eliminated. However, eliminating the mist-vapor separation section 32 would increase the amount of liquid or water that is lost in the process or would increase the cost of recovering the water.

FIG. 2 shows a right side elevational view taken from the vantage point of line 2—2 in FIG. 1. The gas saturation section 24 is equipped with high pressure nozzles 64 and low pressure nozzles 66. The nozzles are connected to a liquid source, usually a water source. The nozzles 64, 66 are in fluid communication with the interior portion of the gas saturation section 24. The nozzles are staggered to allow for uniform "soaking" of the exhaust gas. The high pressure nozzles 64 are pointed in the direction of the exhaust gas flow at an angle of approximately 30 degrees to the exhaust gas flow. The high pressure nozzles helps to agitate the air flow and assist movement through the moist environment of the filtration chamber 22 and prevent the formation of voids within exhaust gas flow.

On the left side (not shown) of the gas saturation section 24, going from the entrance of the filtration chamber 22 towards the center, there are two banks of high volume low pressure nozzles 66, followed by a bank of high pressure nozzles 64. These nozzles are followed by two more banks of low pressure nozzles 66, and another bank of high pressure nozzles 64. The nozzle banks on the left side are opposite the nozzle banks on the right side. The nozzles 64, 66 saturate the exhaust gas with water as it enters the gas saturation section 24.

FIG. 4 shows a top plan view of the filtration chamber 22. Located on top of the gas saturation section 24 are low pressure nozzles 66. Nozzles 66 are connected to a liquid source, usually a water source. Nozzles 66 are in fluid communication with the interior of the filtration chamber 22. Along with the nozzles 64, 66 that are placed on the left and right hand sides of the gas saturation section 24, the low pressure nozzle 66 located on the top of the gas saturation section 24 saturate the gas with water as it passes through the nozzles 64, 66. Due to the amount of water that is released from the nozzles 64, 66 the gas becomes saturated. All, or almost all, of the particular matter that is suspended in the gas is knocked out of the air by the water. These particulates gather at the bottom of the filtration chamber 22.

In addition to particulate matter, there are other materials which are converted to a gas during the combustion process and are contained in the exhaust gas stream. For example, the exhaust gas stream will often contain carbon dioxide, nitrates, sulfates, arsenic, mercury, and other harmful materials. Many of these harmful products will dissolve in water. Therefore, much of these problem materials and gases will be removed from the gas stream in the filtration process.

FIG. 3 shows a bottom view of the filtration chamber 22. Pipe 70 is in fluid communication with an interior portion of filtration chamber 22. Pipe 70 is also in fluid communication with the reclaim pump 38. As particulate matter drops to the bottom of the filtration chamber 22, pump 38 operates to pull the particular matter and water out of the filtration chamber 22 through pipe 70.

Referring to FIGS. 2 and 3, after gas passes through the gas saturation section 24, it flows into the gas-vapor separation section 32. This portion 32 of the filtration chamber 22 is big enough to allow excess airborne water to settle out of the gas stream. The excess airborne water that settles out of the gas stream is eventually reclaimed by pump 38.

The gas then passes into a dehumidifier 34. Dehumidifier 34 is provided to remove excess moisture from the gas stream. The excess moisture is reclaimed through line 68 so that the water can be used again. Preferably, the dehumidifier 34 reduces the relative humidity of the gas to below 40%. Of course, the moisture content of the gas could vary depending on how much of the water needed to be recycled and the extra cost of reducing the humidity of the gas below 40% or replacing the lost water. The gas can then be released through discharge flue 36.

Rather than using a dehumidifier, the first heat exchanger 14 could be designed to reduce the temperature of the gas stream 11 to 40 degrees Fahrenheit or less. At lower temperatures, the gas stream 11 will hold less water. A mechanical water recovery filter could also be placed within the filtration chamber to "wring" most of the remaining moisture from the gas stream 11. However, reducing the temperature to 40 degrees Fahrenheit or less is more expensive than using a dehumidifier to recover the water.

Returning to FIG. 1, air filtration system 10 includes a water recycling system and a heat exchange system. A fresh water supply tank 60 is fluidly coupled to a fresh water pump 28 through line 62. Ideally, supply tank 60 contains enough water to maintain operation of the filtration system 10 for 4 to 5 minutes during routine maintenance. However, supply tank 60 should not contain so much water that it will fill the filtration chamber 22 and back flow into the heat exchanger 14 and exhaust flue.

Fresh water pump 62 is fluidly coupled to fresh water distribution block 26 through line 30. Fresh water distribution block 26 provides fresh water for the nozzles 64, 66. As previously discussed, the nozzles 64, 66 provide water to the interior portion of the filtration chamber 22.

Water is removed from the filtration chamber 22 and dehumidifier 34 via the reclaim pump 38 (FIGS. 2 and 3 ). Reclaim pump 38 pumps water, along with particulates in the water, to sediment tank 44. The sediment tank 44 should be large enough to allow particles in the water to settle out. An auger (not shown) at the bottom of sediment tank 44 is used to remove sediment particles. The removed materials can then be processed as a hazardous waste or as a renewable chemical source.

Next, water flows from sediment tank 44 through line 46 to distillation tank 48. Heat from hot liquid line 16 is used to heat the water and the distillation tank 48 to its boiling point. The majority of the water soluble contaminants (such as nitrates and sulfates) that are present in the exhaust gas flow 11 have a higher evaporation point than water. These contaminants dissolve or are absorbed by the water in the filtration chamber 22. When the water is boiled away, many of the contaminants will remain in the distillation tank 48.

The contaminants that remain after the water is evaporated have an acidic chemical make-up. Due to the acidity, both the distillation tank 48 and the sediment tank 44 are preferably made from a non-corrosive material. Distillation tank 48 should be drained regularly, with the waste being processed as a hazardous waste or as a renewable chemical source.

The water vapor from distillation tank 48 flows through line 52 into condenser 54. The water vapor is cooled back into a liquid in the condenser 54. Return pump 56 pumps the liquid water through line 58 back to the fresh water supply tank 60.

Figure 5:
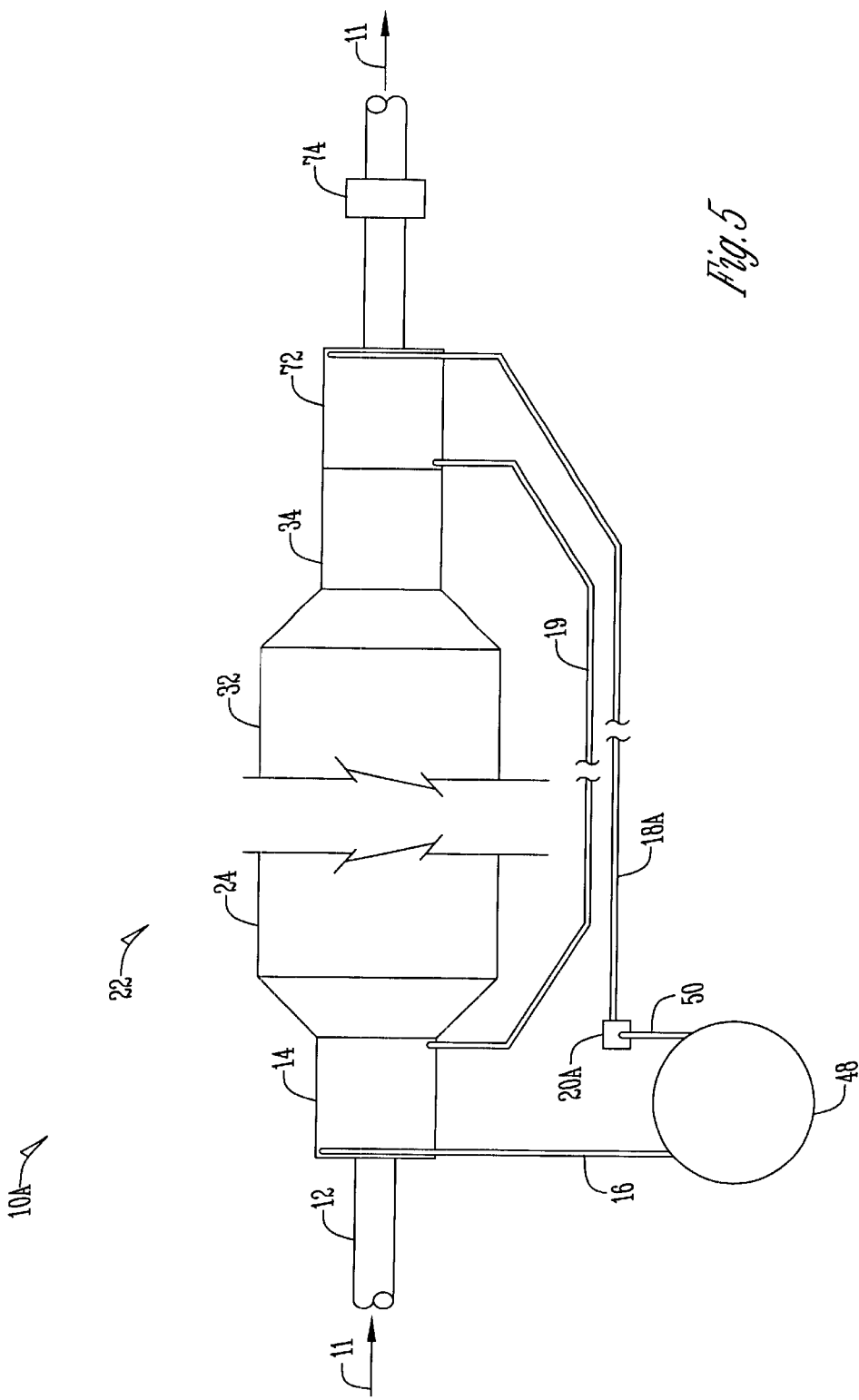
FIG. 5 is a top plan view similar to FIG. 1, showing a heat exchanger and a fan at a gas discharge end.

FIG. 5 is a top plan view of a modified air filtration system 10A. FIG. 5 contains all the elements of FIG. 1. However, many of the elements are not shown, to allow for clear illustration of the differences between FIGS. 1 and 5.

Air filtration system 10A includes a second heat exchanger 72 after the dehumidifier 34. The gas of the dehumidifier 34 has a temperature of about 40 degrees Fahrenheit. Since the average outside temperature in most places is above 60 degrees Fahrenheit, the exhaust gas would settle to the ground if it was discharged from dehumidifier 34. Even after being filtered, the exhaust gas is high in carbon dioxide and nitrogen, and very low in oxygen. This gas concentration would not sustain animal life in the area of the discharge point and could be a health hazard. Therefore, it is desirable to heat the exhaust gas to a temperature where the gas will rise into the atmosphere and dissipate at a point where it is not a hazard. Preferably, the exhaust gas should be heated to a temperature above the hottest outside air temperature.

The second heat exchanger 72 uses excess heat from distillation tank 48. As previously discussed, hot liquid line 16 provides heat to the distillation tank 48. The hot liquid is pumped out by heat exchange or pump 20A from line 50 through line 18A. The hot liquid in line 18A is used to heat the air in heat exchanger 72. After the liquid is cooled in heat exchanger 72, it flows through line 19 to the first heat exchanger 14. The cool liquid from line 19 is used to cool the exhaust gas in the first heat exchanger 14.

The second heat exchanger 72 is connected to an outlet flue 36A. The outlet flue is connected to an exhaust fan 74. When the gas stream is saturated with liquid or water in the gas saturation section 24, the density of the gas stream will increase. This may cause problems with the gas flow, creating a back pressure that would affect the fuel consumption and operation of a boiler connected to the filtration system 10A. It is desirable to maintain normal atmospheric pressure within the filtration chamber 22 to minimize the effect of the filtration process on the designed operation and efficiency of the boiler.

The exhaust fan 74 is used to maintain a constant pressure, preferably normal atmospheric pressure or lower, within the filtration system 10A. Preferably, exhaust fan 74 is a variable speed fan. Pressure sensors (not shown) can be put into the first heat exchanger 14 and the filtration chamber 22. The sensors can be input to a computer. Based on the pressure sensors, the computer adjusts the variable speed fan 74 to maintain constant pressure. The desired effect is to keep the gas flow out the exhaust flue 12 the same as what it would be if the exhaust flue 12 was simply connected to the outside air, rather than the filtration system 10A.

It should be noted that a carbon dioxide scrubbing system could be placed between the fan 74 and the second heat exchanger 72. There are commercially available scrubbing systems which could be used. A scrubbing system is not required.

Although the present invention has been discussed with respect to exhaust gas from a boiler, it is not intended that the invention be limited to that context. In particular, it will be apparent to those skilled in the art that the present invention can be used to clean gas or air from any source. For example, the filtration system could be connected to the open air and could be used to clean air within a building.

A general description of the present invention as well as the preferred embodiment has been set forth above. Those skilled in the art will recognize and be able to practice additional variations in the methods and systems described which fall within the teachings of this invention. Accordingly, all such modifications and additions are deemed to be within the scope of the invention which is to be eliminated only by the claims appended hereto.

I claim:
1. A method of filtering a gas stream, comprising:
   receiving a gas stream of exhaust gas;
   cooling the gas stream;
   saturating the gas stream with a liquid to knock particulates out of the gas stream into a receptacle; and
   removing the particulates from the receptacle.
2. The method of claim 1, wherein the liquid is water.
3. The method of claim 2 wherein the step of cooling the gas stream is cooling the gas stream to a temperature lower than a water boiling temperature prior to saturating the gas stream with water.
4. The method of claim 3, wherein the gas stream is cooled to a temperature of 70° Fahrenheit or less.
5. The method of claim 2, further comprising:
   reducing the flow rate of the gas stream prior to saturating the gas stream with water.
6. The method of claim 2, further comprising:
   dehumidifying the gas stream after saturating the gas stream with water.
7. The method of claim 6, wherein the gas stream is dehumidified to a relative humidity of 40% or less.
8. The method of claim 6, further comprising:
   heating the gas stream after dehumidifying the gas stream.
9. The method of claim 1, wherein the gas stream is an exhaust gas stream from an incinerator.
10. The method of claim 1, wherein the gas stream is an exhaust gas stream from a boiler.
11. A novel gas filtration system, comprising:
    a filtration chamber having a gas inlet opening and a gas outlet opening, the chamber having a sufficient cross-sectional area and volume to allow enough time for the gas flowing through the chamber to become saturated; and
    high and low pressure nozzles in fluid communication with an interior portion of the chamber, the low and high pressure nozzles being connectable to a liquid supply, the low and high pressure nozzles being able to output a sufficient amount of liquid to saturate gas flowing through the filtration chambers;
    a first heat exchanger connected to the gas inlet opening, wherein the first heat exchanger is configure to cool gas as it flows through the first heat exchanger.
12. The gas filtration system of claim 11 further comprising:
    a dehumidifier connected to the gas outlet opening.
13. The gas filtration system of claim 12, further comprising:
    a second heat exchanger connected to an outlet of the dehumidifier, wherein the second heat exchanger is configured to heat gas as it flows through the second heat exchanger.
14. The gas filtration system of claim 13, further comprising:
    a fan in fluid communication with an outlet of the second heat exchanger.
15. The gas filtration system of claim 14, further comprising:
    a pump in fluid communication with the interior of the filtration chamber and the dehumidifier, the pump being configured to remove liquid from the dehumidifier and the filtration chamber; and
    a sediment tank in fluid communication with the pump, wherein the sediment tank allows particulates to settle out of the liquid removed from the filtration chamber and the dehumidifier.

16. The gas filtration system of claim 15, further comprising:

a distillation tank in fluid communication with the sediment tank, wherein heat removed from the first heat exchanger is used to boil liquid in the distillation tank to allow for eventual recovery of the boiled off liquid; and wherein heat removed from the first heat exchanger is also used to provide heat to the second heat exchanger.

17. A method of filtering an exhaust gas stream having an initial flow rate and an initial temperature, comprising:

reducing the flow rate of the exhaust gas stream so that the exhaust gas can be saturated;

cooling the exhaust gas stream to a temperature less than a boiling temperature of water; and saturating the exhaust gas with water to knock particulates out of the exhaust gas stream; and removing the particulates that are knocked out of the exhaust gas stream.

18. The method of claim 17, further comprising:

dehumidifying the exhaust gas stream after saturating it with water.

19. The method of claim 18, further comprising:

heating the exhaust gas stream to a temperature above an outside air temperature.

* * * * *